United States Patent
Verhaeghe O. M. et al.

(10) Patent No.: US 8,627,766 B2
(45) Date of Patent: Jan. 14, 2014

(54) SQUARE BALER

(75) Inventors: Didier Verhaeghe O. M., Ieper (BE); Kevin M. Smith, Narvon, PA (US)

(73) Assignee: CNH America LLC, New Holland, PA (US)

(*) Notice: Subject to any disclaimer, the term of this patent is extended or adjusted under 35 U.S.C. 154(b) by 0 days.

(21) Appl. No.: 13/257,063

(22) PCT Filed: Mar. 16, 2010

(86) PCT No.: PCT/EP2010/053329
§ 371 (c)(1),
(2), (4) Date: Sep. 16, 2011

(87) PCT Pub. No.: WO2010/106038
PCT Pub. Date: Sep. 23, 2010

(65) Prior Publication Data
US 2012/0000377 A1    Jan. 5, 2012

(30) Foreign Application Priority Data
Mar. 17, 2009 (BE) .................................. 2009/0167

(51) Int. Cl.
*A01D 39/00* (2006.01)
*A01D 43/02* (2006.01)
(52) U.S. Cl.
USPC ............... 100/45; 56/10.2 R; 56/341; 100/48; 100/50; 100/99; 100/189
(58) Field of Classification Search
USPC ............... 56/10.2 R, 341; 100/45, 48, 50, 99, 100/188 R, 189
See application file for complete search history.

(56) References Cited

U.S. PATENT DOCUMENTS

| | | | | |
|---|---|---|---|---|
| 4,034,543 A | * | 7/1977 | Voth et al. | 56/341 |
| 4,157,643 A | * | 6/1979 | White | 56/341 |
| 4,627,341 A | * | 12/1986 | Sudbrack et al. | 100/41 |
| 4,855,924 A | * | 8/1989 | Strosser et al. | 700/117 |
| 5,842,335 A | * | 12/1998 | Esau | 56/341 |
| 5,913,801 A | * | 6/1999 | Bottinger et al. | 56/10.2 R |
| 6,050,074 A | * | 4/2000 | Clostermeyer | 56/341 |
| 6,457,405 B1 | * | 10/2002 | Lippens et al. | 100/99 |
| 7,047,719 B2 | * | 5/2006 | Dubois | 56/341 |
| 7,104,191 B1 | * | 9/2006 | Parker et al. | 100/51 |
| 7,287,365 B2 | * | 10/2007 | Dubois | 56/341 |
| 7,398,728 B2 | * | 7/2008 | Hel | 100/45 |
| 7,437,866 B2 | * | 10/2008 | Smith et al. | 56/341 |
| 7,918,158 B2 | * | 4/2011 | Viaud | 100/45 |

FOREIGN PATENT DOCUMENTS

EP    1935233 B1 * 12/2007 ............. A01F 15/08

* cited by examiner

*Primary Examiner* — Dana Ross
*Assistant Examiner* — Onekki Jolly
(74) *Attorney, Agent, or Firm* — Patrick M. Sheldrake

(57) ABSTRACT

The square baler comprises a pick-up a pre-compression chamber, a baling chamber, a loading mechanism for transferring each slice of crop from the pre-compression chamber into the baling chamber and a plunger. The baler further can include at least one non-contact sensor that is provided in at least one of the walls of the pre-compression chamber and/or of the input zone of the baling chamber to produce an output signal indicative of the density of the crop.

11 Claims, 3 Drawing Sheets

SQUARE BALER

This application is the US National Stage filing of International Application Serial No. PCT/EP2010/053329 filed on Mar. 16, 2010 which claims priority to Belgium Application BE 2009/0167 filed Mar. 17, 2009, each of which is incorporated herein by reference in its entirety.

TECHNICAL FIELD

The present invention relates to a square baler.

BACKGROUND ART

Balers are agricultural machines that pick up crop material, such as straw or grass or another crop, lying in a field in swaths and compact the crop material into wrapped or bound bales. The swaths are laid by a combine harvester which, after harvesting the crop, separates the grain from the shafts and the chaff, stores the grain, disperses the chaff and deposits the shafts as swaths on the field being harvested.

There are two varieties of balers, namely round balers and square balers. As their names imply, round balers produce cylindrical bales of round cross section while square balers produce bales of square cross section.

EP 1935233 describes a round baler having a baling chamber fitted with non-contact sensors capable of determining the relative density of the crop in different parts of a bale as it is being formed. A cylindrical bale often has an axial length greater than the width of the swaths on the ground that the baler is picking up. If the operator steers the baler, which may either be self-propelled or towed by a tractor, so that the swath remains central in relation to the baling chamber, then the formed bale will have a higher density at its centre than at its ends. This leads to various problems as described in EP 1935233. To assist the operator in driving the baler to optimise the distribution of the crop across the width of the baling chamber density sensors are provided in the baling chamber.

The same problem of uneven crop density distribution can arise in a square baler but the solution of providing non-contact sensors in the baling chamber does not work for square balers. A first reason for this is that, in a round baler, the crop is constantly circulated past the non-contact sensors and the signal from the sensors varies significantly with the crop density. By contrast, in a square baler, a bale grows slowly and the signal from a sensor placed randomly in the baling chamber would not indicate the crop density in different parts of the bale. A second reason is that the crop density in the baling chamber of a square baler is greater than in a round baler, which makes it more difficult for such a sensor in the baling chamber to be able to determine relative density in different parts of the bale. Such a non-contact sensor measures the proportion of the crop and the voids in between. At such high densities there are approximately no measurable voids in between the crop and the signal of the non-contact sensor remains approximately constant during a change in the density.

DISCLOSURE OF INVENTION

The present invention accordingly seeks to provide a square baler in which crop density can be determined using non-contact sensors.

According to the present invention, there is provided a square baler comprising:
- a pick-up for collecting crop material lying in a swath in a field;
- a pre-compression chamber to form a slice of crop material for a bale of the crop coming from the pick-up;
- a baling chamber for forming a rectangular bale of the slices of crop coming from the pre-compression chamber;
- a loading mechanism for transferring each slice of crop from the pre-compression chamber into the baling chamber; and
- a plunger, movable within the baling chamber to compress further the individual slices to form a square bale, characterised in that at least one non-contact sensor is provided in at least one of the walls of the pre-compression chamber and/or of the input zone of the baling chamber to produce an output signal indicative of the density of the crop.

By placing a non-contact sensor in the pre-compression chamber and/or the input zone of the baling chamber, the present invention allows reliable crop density measurements to be obtained in a square baler, as the speed of crop movement is higher and the density is lower in the pre-compression and/or the input zone of the baling chamber than it is in the baling chamber itself.

In an embodiment of the invention, at least two or more non-contact sensors are provided to produce signals indicative of the density of the crop spread across the width and or the length of the slice of crop present in the pre-compression chamber and/or the input zone of the baling chamber.

This offers the advantage that a density measurement spread over the width of the slice becomes possible on which for example a left/right steering indication can be based. This offers also a further advantage that a density measurement spread over the length of the slice becomes possible which makes sure that the slice contains enough material to fill the baling chamber till the top. It is clear that a combination of the above mentioned advantages is also possible.

According to another embodiment of the invention the square baler further comprises a mechanical sensor for determining the density of the slice of crop present in the pre-compression chamber.

This makes it possible in the case of a failure of for example the mechanical sensor to use the signal of the non-contact sensor or vice-versa.

According to an embodiment of the invention the non-contact sensors are infra-red sensors.

According to a further embodiment of the invention the square baler further comprises a controller for processing the signals of the non-contact sensor or sensors.

According to still a further embodiment of the invention the square baler further comprises an output device to make the signals of the different non-contact sensors that have been processed by the controller visible.

This allows the operator to evaluate the crop density in different zones of the slice in the pre-compression chamber and consequently execute the necessary adjustments, which is a simple way of integrating the current invention into an existing baler.

According to a second aspect of the invention there is provided a method for initiating the loading cycle of the square baler according to the first aspect of the invention, characterised in that the loading cycle is initiated synchronised with the plunger movement after the signal of at least one non-contact sensor indicates a predetermined density of the crop.

This offers the advantage that the crop density at which the loading cycle can be initiated can be adjusted in a simple way by adjustment of the predetermined density, for example by adjusting this predetermined density in the controller of the baler.

According to a preferred embodiment of the invention the loading cycle is initiated synchronised with the plunger movement after the signal of two or more non-contact sensors indicate a predetermined density of the crop.

In this way there is created a robust and flexible system that is insensitive to for example local crop-entanglements and allows adapting the initiation of the loading cycle to the harvesting circumstances, the crop type, etc. for example by adjusting the predetermined densities of the respective sensors in the controller of the baler.

BRIEF DESCRIPTION OF DRAWINGS

The invention will now be described further, by way of example, with reference to the accompanying drawings, in which.

MODE(S) FOR CARRYING OUT THE INVENTION

Figure 1:
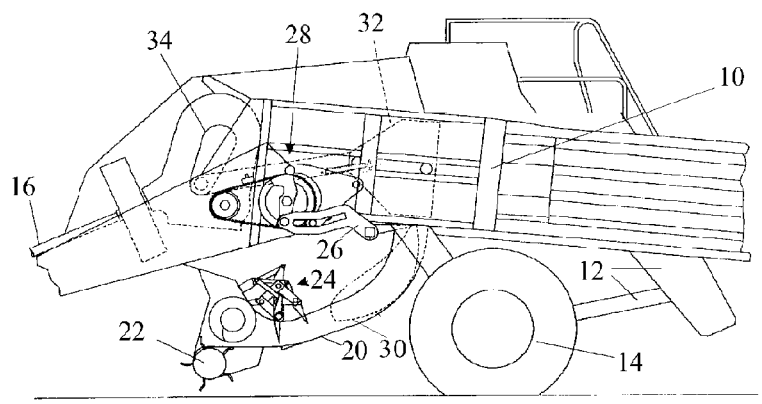
FIG. 1 is a schematic representation of a known square baler.

FIG. 1 shows a side view of a square baler. The figure corresponds to FIG. 1 of EP 0636308 in which all the components of the square baler are described in detail. FIG. 1 will only be described herein to the extent necessary for an understanding of the present invention.

The baler comprises a baling chamber 10 supported by a frame 12 resting on wheels 14. The baling chamber 10 is slightly inclined relative to the horizontal, being lower at the back that at the front. At its front end, the baler has an attachment point (not shown) by means of which it is hitched to a tractor and a power input shaft 16 that is connected to the power take off (PTO) shaft of the tractor.

A pre-compression chamber 20 is located beneath the baling chamber 10. At the lower end of the pre-compression chamber 20, a pick-up roller 22 with tines picks crop from a swath lying on the ground. The crop is compacted by a packer 24 until the pre-compression chamber is filled to a desired density, thereby forming a slice. According to an alternative embodiment which is not shown it is also possible for example to do without the packer, or to provide for example a rotor cutter. The top wall of the pre-compression chamber has slots that can be penetrated by the prongs of a fork 26 that forms part of a loading mechanism more fully described in EP 0636308. For the present invention, it suffices to understand that the fork is moved by a system 28 of cams and levers such that it follows a kidney shaped path represented by a broken line 30 in the drawing.

Once a slice has been formed in the pre-compression chamber 20, a loading cycle is commenced during which the prongs of the fork 26 are inserted at the lower end of the pre-compression chamber (20). As the cycle continues, the slice is moved up into the baling chamber 10 where a plunger 32 further compresses the slices to form a bale. Both the plunger 32 and the system 28 of cams and levers are driven by a gearbox 34 connected to the power input shaft 16.

As is well known, but not shown in FIG. 1, the baler also has a mechanism for encircling the bales, and sometimes individual slices within the bale, with a predetermined length of twine and knotters for forming knots in the twine.

The above description has been given only by way of background and all that is shown in FIG. 1 and described so far is well known from the prior art. The invention will now be described with reference to FIG. 2 which is a modification of FIG. 1d of EP 1153538 in which background to the present invention is also described in more detail.

Figure 2:
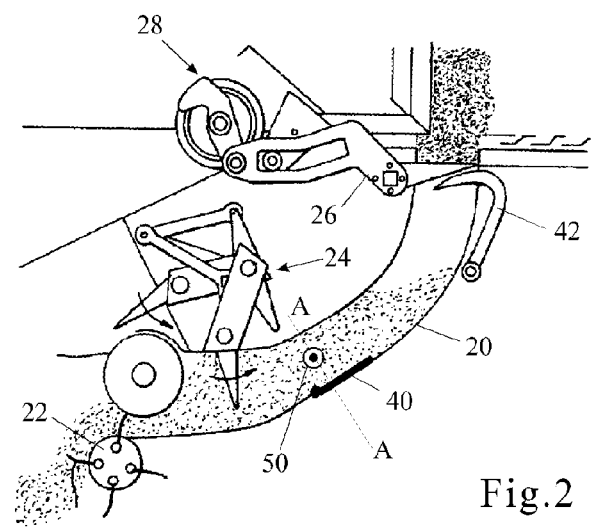
FIG. 2 shows the pre-compression chamber of a square baler according to the invention drawn to an enlarged scale.

The pre-compression chamber 20 shown in FIG. 2 comprises a mechanical sensor 40 on its lower wall. This mechanical sensor 40 can for example comprise a sensor plate or a spring biased door, whereby the strength of the spring acting on the door is adjustable such that the door commences to open when the slice within the pre-compression chamber has reached the desired density. On the basis of the mechanical sensor 40 the system 28 is engaged in synchronism with the plunger 32 to commence a load cycle to transfer a slice from the pre-compression chamber 20 into the baling chamber. FIG. 2 also shows a hook 42 which retains the slice being formed in the pre-compression chamber 20. The hook 42 being retracted at the initiation of the loading operation triggered by the mechanical sensor 40. The mechanical sensor 40 and the hook 42 are all known from, and described in greater detail in, EP 1153538.

Figure 3:
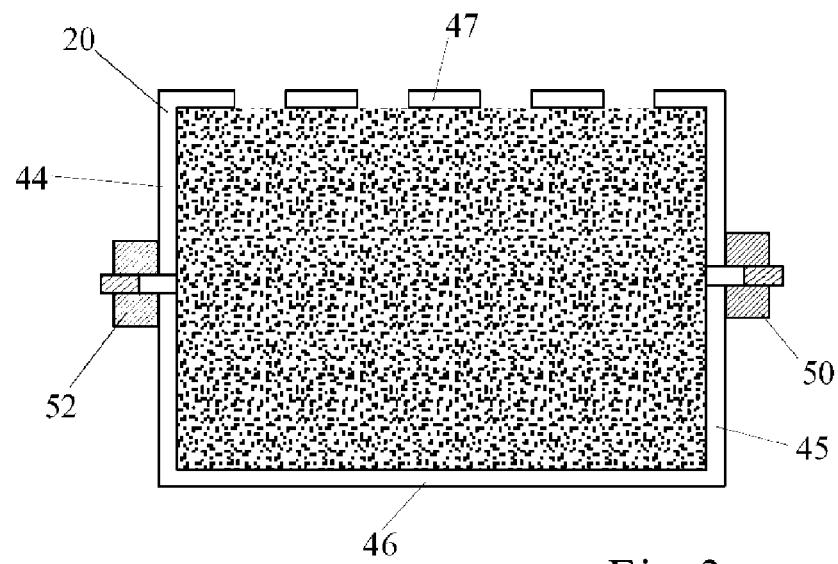
FIG. 3 is a schematic section in the plane A-A in FIG. 2.
Figure 4:
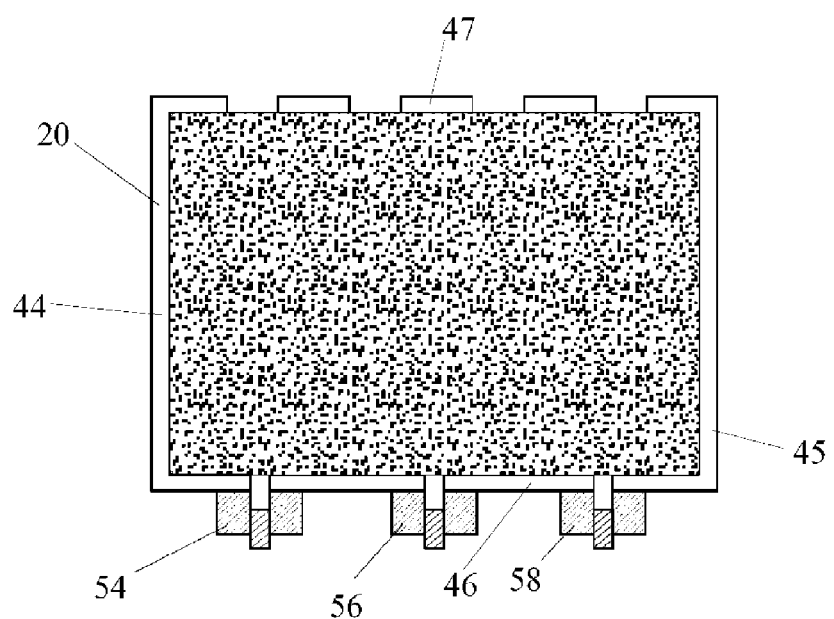
FIG. 4 is a schematic section similar to FIG. 3 through a second embodiment of the invention.

In the embodiment of the present invention shown in FIGS. 2 and 3, two non-contact sensors 50 and 52 are placed in the opposite side walls 44 and 45 of the pre-compression chamber 20. In the embodiment of FIG. 4, three such sensors 54, 56 and 58 are arranged in the bottom wall 46 of the pre-compression chamber 20. According to an alternative embodiment, which is not shown, the sensors 54, 56 and 58 may be arrange in the top wall 47, or they may be distributed between the top wall 47, the bottom wall 46 and/or the side walls 44, 45. It is clear that in place of two or three non-contact sensors, four, five or more non-contact sensors can be arranged spread across both side walls 44, 45, the bottom wall 46 and/or the top wall 47. The non-contact sensors 50, 52, 54, 56 and 58 all operate in a comparable manner as in EP 1935233 to indicate the relative density of the crop at different points across the width of a slice as it is being packed in the pre-compression chamber 20. It concerns for example infra-red sensors, ultra-violet sensors, photo-electrical sensors, ultrasonic sensors or other non-contact sensors that are able to determine the proportion of crop material and the voids in between, for example on the basis of determination of the reflection, absorption or any other way. The signals from the different sensors may therefore be processed to provide the operator with a left/right steering indication to enable an even density to be achieved in each slice before it is transferred to the baling chamber 10. If the density of each slice is uniform, the density throughout the bale will of necessity also be even. According to an alternative embodiment it is also possible to let the controller control the baler automatically in order to attain an even density.

It is also possible to let a controller of the baler use the signal from one or more of the non-contact sensors to determine when a slice in the pre-compression chamber 20 has reached a predetermined density for being transferred by the loading mechanism into the baling chamber 10. This predetermined density can for example be inputted or selected in the controller by the operator in function of the harvesting conditions, the crop type, the characteristics of the desired bale. While such a signal may replace the mechanical sensor 40, it is also possible to combine the non-contact sensors with this mechanical sensor 40. This makes it possible in case of failure of such mechanical sensor 40, to use the signal from the non-contact sensors or vice versa. It is clear that the non-contact sensors 50 in this way can be arranged easily on an existing baler.

Figure 5:
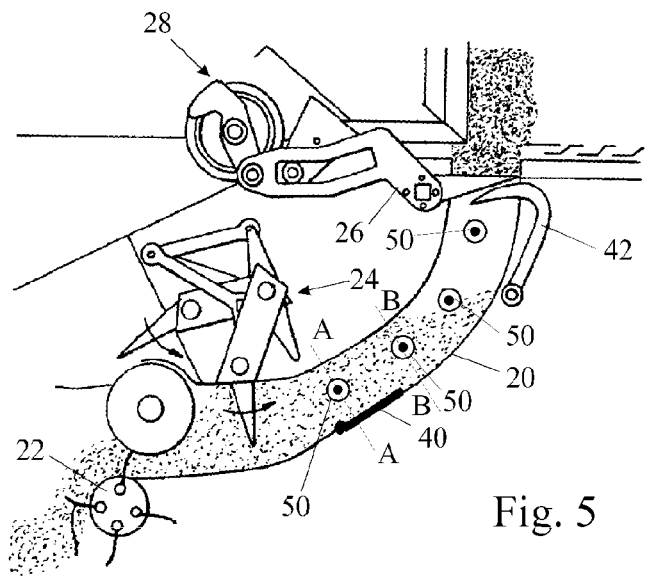
FIG. 5 is a view similar to FIG. 2 of an alternative embodiment of the invention.

In FIG. 5 there is shown a further embodiment of the invention in which multiple sensors 50 are arranged distributed over the sidewall 45 and multiple sensors 52 are arranged distributed over the other sidewall 44. The sections along the line A-A, B-B, and similar sections at the level of the other non-contact sensors are similar to the section shown in FIG. 3. In this way it is possible to generate signals which determine the density of the crop at various locations along the length of the slice being formed in the pre-compression chamber 20. These signals can be processed by a controller of the baler to activate the loading mechanism when the slice has reached a predetermined density at various places along its length. These predetermined densities may for example be inputted or selected in the controller by the operator in function of the harvest conditions, crop type, the characteristics of the desired bale. In this embodiment of the invention it thus becomes possible to ensure that the desired density is present over the entire length of the slice and not only on one specific location. This offers the advantage that the loading cycle will not be initiated as a consequence of for example a crop entanglement at the height of one of the sensors, thus avoiding a slice with inadequate crop to fill up the baling chamber 10 until the top arriving in the baling chamber 10, which could give rise to bales with an irregular shape and the impossibility to achieve bales with a maximal weight. It is clear that according to a variant embodiment, which is not shown, the non-contact sensors can be arranged similar as in the embodiment shown in FIG. 4 or at one's discretion distributed in one or more walls 44, 45, 46, 47 of the pre-compression chamber 20.

It is therefore clear that by providing one or more non-contact sensors in the pre-compression chamber of a rectangular baler the invention provides signals indicative of the crop density that can be used as a steering indication or for the initiation of the loading cycle when a slice with the desired density is formed in the pre-compression chamber or for both.

According to an alternative embodiment which is not shown, it is also possible through the controller of the baler to make the signals from the various non-contact sensors visible on for example a screen or a display or another suitable output device to allow the operator to evaluate the density of the crop in different zones of the slice in the pre-compression chamber 20 and consequently execute the necessary adjustments such as for example adjusting the steering of the tractor that moves the baler or adjusting the sensitivity of the mechanical sensor 40. This embodiment allows without further ado to adapt an existing baler in a simple way to a baler according to the invention.

Figure 6:
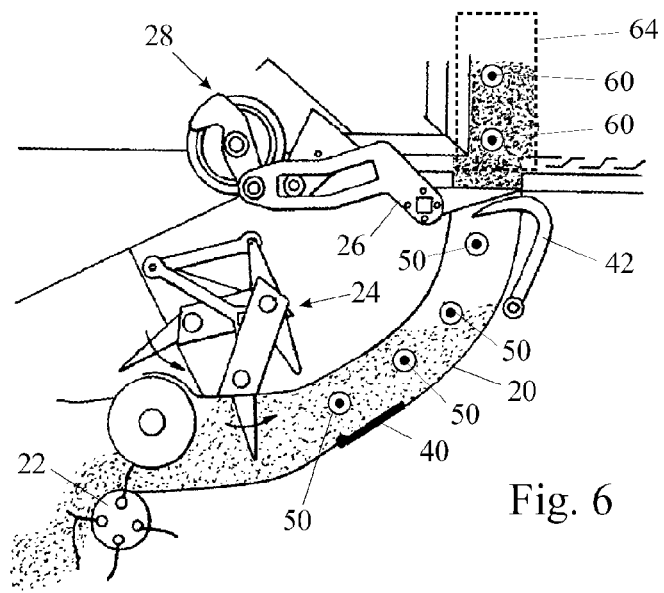
FIG. 6 is a view similar to FIG. 6 of another alternative embodiment of the invention.

According to a further embodiment as shown in FIG. 6, it is also possible to additionally arrange non-contact sensors 60 in the sides of the baling chamber 10, but then specifically in the input zone 64 of the baling chamber 10 that is located in extension of the pre-compression chamber 20. In this zone the crop material of the slice that was taken by the fork 26 during the loading cycle from the pre-compression chamber 20 arrives before it is compressed by the plunger 32 of the baler against the bale which is being formed in the baling chamber 10. Similar to the embodiments mentioned above it is possible to obtain signals of these non-contact sensors 60 for a left-right steering indication (density measurements over the width of the slice) or for an indication whether the slice fills the bale chamber from bottom to top (density measurements over the length of the slice). According to a variant which is not shown it is also possible to arrange non-contact sensors in the top wall of the bale chamber, but then specifically at the level of the input zone 64 of the baling chamber 10.

According to a variant not shown it is also possible to only arrange non-contact sensors 60 in the walls of the input zone 64 of the baling chamber 10. This however is not a preferred embodiment since it is then of course not possible anymore to use the signals of the non-contact sensors 60 to initiate the loading cycle. Furthermore, also the time span that is available to execute density measurements in the input zone 64 of the baling chamber 10 is much smaller than in the pre-compression chamber 20. The crop is situated in this input zone 64 during a loading cycle for a particular configuration of the baler, for example only 25 to 50 ms, while it is present in the pre-compression chamber 20 for the same configuration for at least 700 ms, which increases the reliability of the density measurement.

The rectangular baler according to the invention as defined in the claims of course is not limited to the embodiments described by way of example and shown in the figures, but may also include combinations and variations within the scope of the claims.

We claim:

1. A square baler comprising:
   a pick-up configured for receiving crop material and transferring it toward a baling chamber;
   a pre-compression chamber to form a slice of crop material for a bale of the crop coming from the pick-up;
   the baling chamber for forming a rectangular bale of the slices of crop coming from the pre-compression chamber;
   a loading mechanism for transferring each slice of crop from the pre-compression chamber into the baling chamber;
   a plunger, movable within the baling chamber to compress further the individual slices to form a square bale;
   a first non-contact sensor is provided in at least one sidewall of the pre-compression chamber to produce an output signal indicative of the density of the crop; and
   at least one additional non-contact sensor located on a sidewall downstream of the first non-contact sensor, the sensors configured for measuring density at at least two different points along a crop flow path in the pre-compression chamber.

2. A square baler according to claim 1, wherein the non-contact sensors are provided to produce signals indicative of the density of the crop spread across the length of the slice of crop present in the pre-compression chamber and/or the input zone of the baling chamber.

3. A square baler according to claim 1 further comprising a mechanical sensor for determining the density of the slice of crop present in the pre-compression chamber.

4. A square baler according to claim 1, wherein the non-contact sensors are configured to output multiple signals indicative of density over the formation of a slice.

5. A square baler, according to claim 1, further comprising a controller for processing the signals of the non-contact sensor or sensors.

6. A square baler according to claim 5, further comprising an output device to make the signals of the different non-contact sensors that have been processed by the controller visible.

7. A square baler according to claim 1, wherein the loading cycle is synchronized with the plunger movement and initiated after the signal of at least one non-contact sensor indicates a predetermined density of the crop.

8. A square baler according to claim 1, wherein the loading cycle is synchronized with the plunger movement and initiated after the signal of two or more non-contact sensors indicate a predetermined density of the crop, wherein the two or more sensors are located at different lengths along the crop flow path.

9. A square baler according to claim 1, wherein the at least one additional non-contact sensor is located in the baling chamber of the baler.

10. A square baler according to claim 9, wherein the at least one non-contact sensor is located in an input zone of the baling chamber from the pre-compression chamber.

11. A square baler according to claim 1, wherein the first non-contact sensor is paired with a second non-contact sensor and both first and second non-contact sensors are located along opposing side walls of the pre compression chamber upstream of the at least one additional non-contact sensor.

* * * * *